United States Patent
Hoermann

(10) Patent No.: US 7,973,273 B2
(45) Date of Patent: Jul. 5, 2011

(54) LIGHT BARRIER WITH FEEDBACK CONTROL

(75) Inventor: Michael Hoermann, Halle (DE)

(73) Assignee: Marantec Antriebs—und Steuerungstechnik GmbH & Co. KG (DE)

(*) Notice: Subject to any disclaimer, the term of this patent is extended or adjusted under 35 U.S.C. 154(b) by 89 days.

(21) Appl. No.: 12/321,783

(22) Filed: Jan. 26, 2009

(65) Prior Publication Data

US 2009/0224137 A1 Sep. 10, 2009

(30) Foreign Application Priority Data

Jan. 25, 2008 (DE) .............. 20 2008 001 122 U

(51) Int. Cl.
*G01J 1/44* (2006.01)

(52) U.S. Cl. ............... 250/221; 250/222.1; 250/208.4; 340/556

(58) Field of Classification Search ........... 250/221, 250/222.1, 208.4; 340/556
See application file for complete search history.

(56) References Cited

U.S. PATENT DOCUMENTS

| 3,746,863 A * | 7/1973 | Pronovost ............ 250/221 |
| 3,932,742 A | 1/1976 | Freudenschuss et al. |
| 3,972,021 A | 7/1976 | Leitz et al. |

FOREIGN PATENT DOCUMENTS

| DE | 1294856 | 5/1969 |
| DE | 100 18 948 | 11/2000 |
| DE | 10 2007 024210 | 11/2008 |
| DE | 20 2007 014 387 | 2/2009 |
| EP | 0391883 | 6/1995 |
| EP | 2012144 | 1/2009 |

* cited by examiner

*Primary Examiner* — Seung C Sohn
(74) *Attorney, Agent, or Firm* — Dilworth & Barrese, LLP

(57) ABSTRACT

The present invention relates to a light barrier for the monitoring of a light path having a base assembly of a first transmitter emitting a light signal and a first receiver generating an output signal for a control. In accordance with the invention, the light barrier has an active reflector assembly having a second receiver for the reception of the light signal emitted by the first transmitter and a second transmitter for the transmission of a feedback signal in dependence on the received light signal.

17 Claims, 1 Drawing Sheet

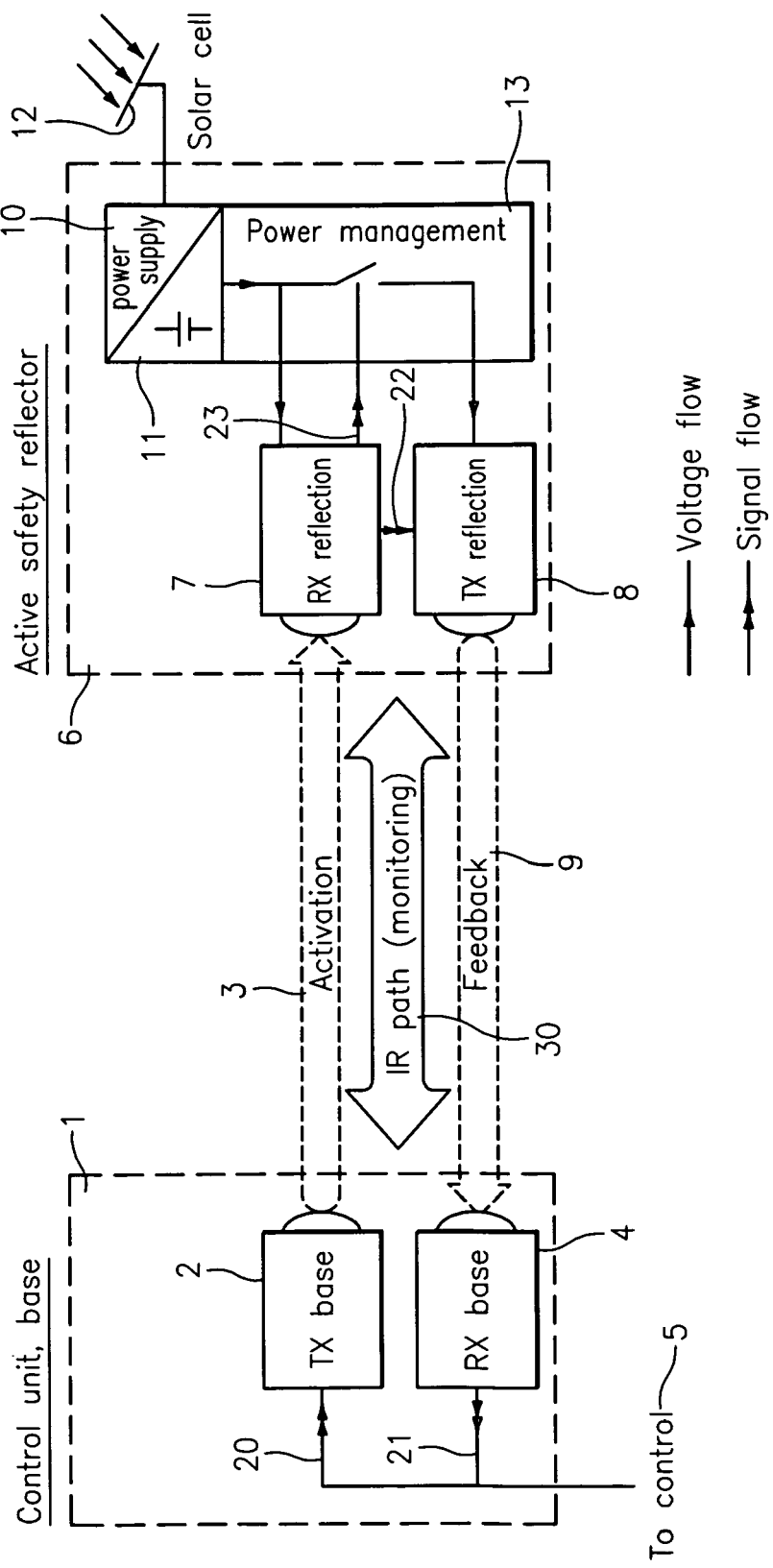

LIGHT BARRIER WITH FEEDBACK CONTROL

BACKGROUND OF THE INVENTION

The present invention relates to a light barrier for the monitoring of a light path having a base assembly of a first transmitter emitting a light signal and a first receiver generating an output signal for a control. The present invention in particular relates to light barriers for the control of door drives.

It can be detected by such a light barrier whether an object is located in the monitored light path in that a check is made using the receiver whether the object is blocking the light signal emitted by the transmitter or not. The receiver of the base assembly evaluates the irradiated light signal and provides a corresponding switch signal at a control output. In this respect, both an operating principle with a static output signal and a dynamic principle are possible.

Known light barriers are either designed as one-way light barriers, with the transmitter being arranged on one side of the light path to be monitored and the receiver directly irradiated by it being arranged on the other side. Alternatively to this, reflection light barriers are used in which the light emitted by the transmitter of the base assembly is reflected via a passive reflector back to the receiver of the base assembly. Such reflection light barriers are easier to install and can be manufactured more cost-effectively, but have a lower safety level due to possibly occurring erroneous reflection and their range is therefore limited.

SUMMARY OF THE INVENTION

It is therefore the object of the present invention to provide a light barrier which has a higher safety level with respect to known reflection light barriers.

This object is satisfied in accordance with the invention by a light barrier in accordance with the description herein. Such a light barrier for the monitoring of a light path first has a base assembly consisting of a first transmitter emitting a light signal and a first receiver generating an output signal for a control. In accordance with the invention, the light barrier furthermore has an active reflector assembly which has a second receiver for the reception of the light signal emitted by the first transmitter and a second transmitter for the transmission of a feedback signal in dependence on the received light signal. Unwanted optical reflections which impair the safety of known passive reflection light barriers can hereby be precluded. A limitation of the range due to erroneous reflections is accordingly not given. The light barriers in accordance with the invention can thus be designed for all door applications without any restriction in range. An equivalent or higher safety level can thus be achieved by the light barrier in accordance with the invention and the manufacturing and/or installation effort and/or cost can simultaneously be reduced.

A first optical signal path between the first transmitter and the second receiver thus first results with the light barrier in accordance with the invention. The active reflector arrangement has an evaluation unit which checks whether the light signal emitted by the first transmitter arrives at the second receiver. If this is the case, the second transmitter emits a feedback signal. The second optical signal path is now located between the second transmitter and the first receiver. The base assembly therefore receives the feedback signal of the reflector assembly via the first receiver and evaluates it.

If a correct feedback signal arrives at the first receiver, this means that neither the first optical signal path nor the second optical signal path is blocked. If, in contrast, there is an object in the light path which would impair the transmission of the light signals in the first and/or second signal path, the base assembly does not receive a correct feedback signal on the transmission of a light signal. The base assembly then generates a corresponding switch signal for the control e.g. of a door drive.

The first and the second transmitters advantageously transmit different signals. The operating safety of the light barrier in accordance with the invention is hereby improved since the two optical signal paths are monitored with different signals. In this respect, the two receivers each check whether a correct signal is irradiated. The signal emitted by the first transmitter is thus not accepted as a valid feedback signal by the first receiver. The feedback signal emitted by the second transmitter is equally not accepted as a valid activation signal by the second receiver. The transmitters each have corresponding evaluation electronics for this purpose. It can hereby be precluded that light reflected back from an object located in the light path impairs the safety of the light barrier. A greater freedom of the optical arrangement of the transmitters and receivers is also provided by the use of different signals since scattered light of the one signal path no longer influences the other signal path.

In this respect, the feedback signal emitted by the second transmitter can have a different frequency than the signal emitted by the first transmitter. Due to the different frequencies of the signals used for the two signal paths, they can be reliably distinguished from one another so that an influencing between the signal paths is avoided. In this respect, uncoded signals can be used, which simplifies the evaluation. Alternatively or additionally, the feedback signal emitted by the second transmitter can also have a different encoding than the signal emitted by the first transmitter. It is thus e.g. possible to work with like carrier frequencies, but differently encoded signals for the two optical signal paths. It is thus possible to make use of the same transmission protocol for both signal paths and only to use a different encoding for the two signal paths. High security against interference also results here since the signals of the one signal path can no longer influence the operation of the other signal path. Different frequencies and different encodings can, however, naturally also be used.

The first transmitter and the first receiver advantageously form one unit. The second transmitter and the second receiver can equally advantageously form one unit. A simple installation and alignment of the light barrier hereby results since only the base assembly made as a first unit and the reflector assembly made as a second unit have to be installed and aligned with respect to one another.

Alternatively to an arrangement in which the feedback signal of the second transmitter is irradiated directly onto the first receiver, however, more complex light paths are also conceivable in which the feedback signal is guided back to the first receiver via further reflectors which are optionally active.

As described, the principle of the reflection light barrier in accordance with the invention is based on at least two optical signal paths for the monitoring of a light path. With an unchanging electrical operation sequence, different spatial arrangements are possible for the optical signal paths depending on the application.

In this connection, a separate arrangement is first possible in which the first transmitter and the first receiver are or can be arranged at a certain spacing from one another and have separate optical systems and/or the second transmitter and the second receiver are or can be arranged at a certain spacing from one anther and have separate optical systems. Two separate optical light paths are hereby provided which are monitored by the light barrier in accordance with the invention.

A compact arrangement is furthermore also possible in which the transmitters and receivers are each arranged spatially adjacent. The transmitter and the receiver in particular advantageously have a common optical system so that the production costs can be reduced and the alignment effort is reduced. Due to this integration of the transmitter and receiver in one module with a common optical system, the system can be combined onto a bidirectional optical light path in which the two optical signal paths coincide.

In a further advantageous manner, the energy supply of the base assembly and of the reflector assembly is made separately so that the installation effort and/or costs can be reduced.

In a further advantageous manner, the energy supply and the reflector assembly takes place via an electrical energy store and/or a solar collector. Since the energy supply of the reflector assembly accordingly takes place via a rechargeable battery or a solar collector with rechargeable battery buffering, the installation effort of the laying of leads is only restricted to the base device, while the active reflector assembly in accordance with the invention, like a passive reflector assembly, manages without any voltage connection or mains connection.

In a further advantageous manner, the reflector assembly has a stand-by mode. Energy can thereby be saved so that a long operating time is nevertheless possible in particular on the use of an electronic energy store and/or of a solar collector. The reflector assembly in accordance with the invention in particular switches into the stand-by mode when the second receiver has not received a light signal from the transmitter of the base assembly for a specific time.

In a further advantageous manner, the second receiver switches from an inactive state to an active state in preset intervals in the stand-by mode to switch into a normal mode with constant reception readiness on the reception of a corresponding light signal. The receiver of the reflector assembly is accordingly only switched on briefly in suitable cycles to check whether a valid signal is being applied. On a valid activation of the base assembly, a wake-up then takes place with a change into the normal operation in which the receiver is continuously ready for reception. In contrast, without the stimulus from the base assembly, the reflector unit remains in the energy-saving stand-by mode. The energy supply of the second transmitter is advantageously deactivated in the stand-by mode. The transmitter of the reflector unit is therefore only activated when a corresponding activation signal is output by the receiver of the reflector unit.

Operation with visible light or with infrared light is possible for the light barrier in accordance with the invention. However, the transmitters in accordance with the invention are advantageously infrared transmitters. They make invisible light barriers possible and are therefore used as standard in optical light barriers.

The present invention furthermore comprises an active reflector arrangement for a light barrier for the monitoring of a light path having a receiver for the reception of a light signal and a transmitter for the transmission of a feedback signal in dependence on the received signal. The same advantages hereby evidently result such as were already described above with respect to the light barrier in accordance with the invention.

The active reflector assembly is in this respect advantageously a reflector assembly such as was already described further above with respect to the light barrier in accordance with the invention.

The light barrier in accordance with the invention is advantageously used in the control of a door drive. The light barrier in accordance with the invention can in particular be designed for all door applications without any limitation of the range. In accordance with the invention, the present invention therefore comprises a door drive control having a light barrier such as has been described above.

BRIEF DESCRIPTION OF THE DRAWING

The present invention will now be presented in more detail with reference to an embodiment and to a drawing.

There is shown

FIG. 1 a schematic diagram of the light barrier in accordance with the invention with the reflector assembly in accordance with the invention.

DESCRIPTION OF THE PREFERRED EMBODIMENT

FIG. 1 shows a schematic diagram of the light barrier in accordance with the invention for the monitoring of the light path 30. The base assembly 1 has a first transmitter 2 which emits a light signal 3 along the light path to be monitored as well as a first receiver 4 which generates an output signal for a control 5. The base assembly 1 is made as a base device into which the first transmitter 2 and the first receiver 4 are integrated. They thereby form a unit.

Instead of a passive reflector, the light barrier in accordance with the invention now has in accordance with the invention an active reflector assembly 6 which has a second receiver 7 for the reception of the light signal 3 emitted by the first transmitter 2 and a second transmitter 8 for the transmission of a feedback signal 9 in dependence on the received signal. The active reflector assembly 6 also forms a unit into which the second receiver 7 and the second transmitter 8 are integrated.

The active reflector assembly in accordance with the invention replaces a passive reflector in the light barrier in accordance with the invention, with the primary transmission signal being emitted by the base device via the light path 30 to be monitored to the second receiver 7 and activating the receiver there. After a positive evaluation, a feedback signal is then transmitted back from the reflector assembly 6 via the second transmitter 8 to the first receiver 4 of the base assembly 1. The first receiver 4 in the base assembly 1 then evaluates the signal and provides a corresponding switch signal at the output 21. In this respect, both an operating principle with a static output signal and a dynamic principle are possible.

The transmitter 2 of the base assembly 1 has a control input 20 via which it can be controlled by the control 5. It can thus be switched off for example, by a door control in certain phases when a monitoring of the light path 30 is not needed. The receiver 4 of the base assembly 1 has an output 21 via which the output signal is guided to the control 5. The receiver 4 of the base unit checks whether the feedback signal 9 is being applied or not and accordingly outputs an output signal which corresponds to a light path without obstacles or to a light path blocked by an object.

In accordance with the invention, an equivalent or higher safety level in comparison with one-way light barriers is achieved by the light barrier system. Errors due to unwanted optical reflection as with conventional passive reflection light barriers are precluded. A limitation of the range due to erroneous reflections is accordingly not given. The light barriers can be designed for a door application without limitation of range.

The two optical signal paths in this respect work with different signals to be able to distinguish correct signals from reflected interference signals so that interference reflections, which can be caused by an object in the light path with a conventional reflection light barrier, can no longer influence the reliability of the object recognition. In the embodiment, the transmitter 2 of the base assembly in accordance with the invention works at a different signal frequency than the transmitter 8 of the reflector assembly in accordance with the invention. The receivers in each case check the frequency of an incoming signal and only evaluate it as a control signal if it has the correct signal frequency. The base assembly and the reflector assembly can thus distinguish between a reflected interference signal (with a false frequency) and the correct signal (with the correct frequency).

A further advantage of the light barrier in accordance with the invention is the simple installation. The power supply of the reflector unit can in particular take place independently of the base device, which reduces the installation effort and/or cost.

In the embodiment shown, a solar collector 12 with rechargeable battery buffering 10 is provided so that the installation effort and/or cost of the laying of leads is only limited to the base device, while no external power supply is required for the reflector unit. Alternatively, a battery could also be used for the energy supply of the reflector unit.

If the reflector assembly 6 is in normal operation, the receiver is continuously ready for reception. If, however, it does not receive any signal over a preset time, it automatically changes into the stand-by mode which is provided to save energy. The energy supply of the second transmitter is deactivated in the stand-by mode.

The receiver is briefly switched on in suitable cycles in the stand-by mode and checks whether an activation signal is being transmitted by the base assembly 1. On a valid activation, a wake-up then takes place with a change into the normal operation in which the receiver is continuously ready for reception. In contrast, without the stimulus from the base device, the reflector assembly 6 remains in the energy-saving stand-by mode. The reception periods of the receiver during the stand-by operation advantageously amount to between 1 ms and 50 ms, typically approximately 10 ms. In contrast, longer pause times are used to save energy. They are advantageously between 50 and 500 ms, typically between 100 and 300 ms. The pause times are advantageously more than five times as long, in particular more than ten times as long, as the reception times so that a low power consumption results during stand-by operation.

The individual components of the light barrier in accordance with the invention will now be briefly characterized again:

The first transmitter 2 forms a part of the base assembly. It is an infrared transmitter which transmits the transmission signal 3 along the light path to be monitored to the receiver 7 of the reflector assembly 6 for the activation of the reflector unit. The frequency of the activation signal the first transmitter 2 emits is $f_{Activation}$.

The first receiver 4 likewise forms a part of the base assembly 1. It is an infrared receiver which generates an output signal via the output 21 for the control 5. This output signal is formed dependent on whether a light signal is emitted back along the light path to the first receiver at the frequency $f_{Feedback}$. The output of the base assembly for the control can have a different design. For example, a dynamic output can be used here or a static output with a semiconductor or a relay (potential free).

The second receiver 7 forms a part of the reflector assembly in accordance with the invention. It is an IR receiver which checks whether the activation signal 3 output by the first transmitter 2 is being applied. The active reflector assembly has, for this purpose, corresponding electronics which detect the activation signal. The frequency of the signal incident at the transmitter is in particular determined and a check is made whether it corresponds to the frequency $f_{Activation}$ of the first transmitter 2. In this respect, the receiver has a normal operation in which it is constantly ready for reception. If furthermore has a stand-by operation in which brief reception periods of approximately 10 s alternate with long pause times of approximately 100 to 300 ms. A substantially reduced power consumption hereby results. If the second receiver 7 detects the activation signal of the base assembly 1, it generates a control signal which is passed on via the signal path 22 to the second transmitter which thereupon outputs a feedback signal.

The second transmitter 8 is likewise part of the reflector assembly 6. It is an infrared transmitter which is externally triggered by the second receiver 7. If the second transmitter is controlled accordingly, it outputs a feedback signal at the frequency $f_{Feedback}$, where $f_{Feedback}$ differs from $f_{Activation}$. It is precluded by the use of different frequencies for the activation signal and for the feedback signal that unwanted reflections impair the security of the light barrier.

The base assembly furthermore has a power management 13 which cooperates with the solar cell 12 and the rechargeable battery 11 and supplies the transmitter and the receiver of the reflector assembly with energy. The power management is controlled by the second receiver 7 via the signal path 23 to implement the stand-by function. The energy supply for the second transmitter 8 is in particular completely shut down in the stand-by mode. The power management 13 furthermore takes over the charging of the rechargeable battery 11.

The reflection light barrier in accordance with the invention is based in this respect on two optical signal paths 3 and 9 for the monitoring of the light path 30. With an unchanging electrical operation sequence, different spatial arrangements are possible for the optical signal paths depending on the application.

Separate Arrangement:

The transmission and reception devices are spatially separated in the base assembly and in the reflector assembly and form two separate optical light paths. The working procedure is then comparable with two one-way light barriers which have been connected sequentially. In this respect, as shown in the embodiment, both the transmitter and the receiver can in each case be integrated in one unit and only have a corresponding spacing. It is alternatively also possible that the individual transmitters and receivers each form separate units which can then be installed correspondingly more flexibly. The monitoring of a bigger light path is moreover hereby possible. In this respect, different signals also do not necessarily have to be used for the two optical signal paths for the separate arrangement.

Compact Arrangement

The transmission and reception devices are in this respect both arranged spatially adjacent both in this base device and in the reflector unit so that two light paths result which are arranged as in a conventional passive reflection light barrier. In the integration of the photo-transmitter and receiver in one module, the system can be combined onto a bidirectional optical light path. The advantage results in this respect that a complex optical system can be saved and the arrangement is easier to adjust. Only one respective lens system is necessary for the base and for the reflector unit.

The invention claimed is:

1. A light barrier for the monitoring of a light path having a base assembly of a first transmitter emitting a light signal and a first receiver generating an output signal for a control, comprising
    an active reflector assembly having a second receiver for the reception of the light signal emitted by the first transmitter and a second transmitter for the transmission of a feedback signal in dependence on the received light signal,
    wherein the first and the second transmitters transmit different signals.

2. A light barrier in accordance with claim 1, wherein the feedback signal emitted by the second transmitter has a different frequency than the signal emitted by the first transmitter.

3. A light barrier in accordance with claim 2, wherein the feedback signal emitted by the second transmitter has a different encoding than the signal emitted by the first transmitter.

4. A light barrier in accordance with claim 3, wherein the first transmitter and the first receiver form a unit and/or the second transmitter and the second receiver form a unit.

5. A light barrier in accordance with claim 4, wherein the first transmitter and the first receiver are or can be arranged at a certain spacing from one another and have separate optical systems and/or the second transmitter and the second receiver are or can be arranged at a certain spacing from one another and have separate optical systems.

6. A light barrier in accordance with claim 2, wherein the first transmitter and the first receiver form a unit and/or the second transmitter and the second receiver form a unit.

7. A light barrier in accordance with claim 1, wherein the feedback signal emitted by the second transmitter has a different encoding than the signal emitted by the first transmitter.

8. A light barrier in accordance with claim 1, wherein the first transmitter and the first receiver form a unit and/or the second transmitter and the second receiver form a unit.

9. A light barrier in accordance with claim 8, wherein the first transmitter and first receiver have a common optical system and the second transmitter and second receiver have a common optical system.

10. A light barrier in accordance with claim 7, wherein the first transmitter and the first receiver form a unit and/or the second transmitter and the second receiver form a unit.

11. A light barrier in accordance with claim 1, wherein the first transmitter and the first receiver are or can be arranged at a certain spacing from one another and have separate optical systems and/or the second transmitter and the second receiver are or can be arranged at a certain spacing from one another and have separate optical systems.

12. A light barrier in accordance with claim 1, wherein the energy supply of the base assembly and reflector assembly are made separately.

13. A light barrier in accordance with claim 1, wherein the energy supply of the reflector assembly takes place via an electrical energy store and/or a solar collector.

14. A light barrier in accordance with claim 1, wherein the reflector assembly has a stand-by mode.

15. A light barrier in accordance with claim 14, wherein the second receiver switches from an inactive state into an active state at preset intervals in the stand-by mode to switch into a normal mode with constant reception readiness on reception of a corresponding light signal.

16. A door drive control comprising a light barrier in accordance with claim 1.

17. A light barrier in accordance with claim 1, wherein the first transmitter and the first receiver form a unit and/or the second transmitter and the second receiver form a unit.

* * * * *